United States Patent
Li et al.

(10) Patent No.: US 12,328,613 B2
(45) Date of Patent: Jun. 10, 2025

(54) MEASUREMENT GAP CANCELLATION

(71) Applicant: APPLE INC., Cupertino, CA (US)

(72) Inventors: Qiming Li, Beijing (CN); Chunhai Yao, Beijing (CN); Dawei Zhang, Saratoga, CA (US); Huaning Niu, San Jose, CA (US); Jie Cui, San Jose, CA (US); Manasa Raghavan, Sunnyvale, CA (US); Xiang Chen, Campbell, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/905,231

(22) PCT Filed: Sep. 24, 2021

(86) PCT No.: PCT/CN2021/120255
§ 371 (c)(1),
(2) Date: Aug. 29, 2022

(87) PCT Pub. No.: WO2023/044733
PCT Pub. Date: Mar. 30, 2023

(65) Prior Publication Data
US 2024/0236735 A1    Jul. 11, 2024

(51) Int. Cl.
*H04W 24/10* (2009.01)
*H04W 72/12* (2023.01)
(52) U.S. Cl.
CPC ........... *H04W 24/10* (2013.01); *H04W 72/12* (2013.01)

(58) Field of Classification Search
CPC .............................. H04W 72/12; H04W 24/10
See application file for complete search history.

(56) References Cited

U.S. PATENT DOCUMENTS

| | | |
|---|---|---|
| 2013/0028126 A1 | 1/2013 | Kazmi |
| 2019/0274146 A1* | 9/2019 | Tang ..................... H04W 24/08 |
| 2022/0264593 A1* | 8/2022 | Wang .................. H04W 72/542 |
| 2023/0379860 A1* | 11/2023 | Rao ........................... G01S 5/01 |
| 2024/0255569 A1* | 8/2024 | Cheng ................. H01L 27/0285 |

FOREIGN PATENT DOCUMENTS

| | | |
|---|---|---|
| CN | 101646251 A | 2/2010 |
| CN | 102084682 A | 6/2011 |
| CN | 105474682 A | 4/2016 |
| CN | 106535245 A | 3/2017 |
| CN | 108112281 A | 6/2018 |
| CN | 112566266 A | 3/2021 |
| CN | 113424586 A | 9/2021 |

(Continued)

OTHER PUBLICATIONS

PCT/CN2021/120255, International Search Report and Written Opinion, May 25, 2022, 11 pages.

*Primary Examiner* — Kevin M Cunningham
(74) *Attorney, Agent, or Firm* — Dorsey & Whitney LLP

(57) ABSTRACT

The present disclosure relates to measurement gap cancellation. A method for a user equipment (UE) may comprise receiving, from a network (NW) device, measurement gap (MG) cancellation information associated with a particular MG of one or more MG patterns to be used by the UE; and determining whether the particular MG shall be cancelled based on the MG cancellation information.

11 Claims, 13 Drawing Sheets

(56) References Cited

FOREIGN PATENT DOCUMENTS

| | | | |
|---|---|---|---|
| JP | 2007104010 | A | 4/2007 |
| WO | 2017138985 | A1 | 8/2017 |
| WO | 2018144584 | A1 | 8/2018 |
| WO | 2020145727 | A1 | 7/2020 |
| WO | 2020163368 | A1 | 8/2020 |
| WO | 2020167814 | A1 | 8/2020 |
| WO | 2020223681 | A1 | 11/2020 |

* cited by examiner

500 determining whether a particular MG of one or more MG patterns to be used by a UE shall be cancelled
502

transmit, to the UE, MG cancellation information associated with the particular MG, the MG cancellation information comprising an indicator in a control information to explicitly indicate the particular MG of the multiple concurrent MG patterns shall be cancelled
504

FIG. 5

MEASUREMENT GAP CANCELLATION

TECHNICAL FIELD

This application relates generally to wireless communication systems, including a wireless device and a network device for measurement gap (MG) cancellation.

BACKGROUND

Wireless mobile communication technology uses various standards and protocols to transmit data between a base station and a wireless communication device, Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

SUMMARY

In order to facilitate smooth network transitions (e.g., cell handovers, redirection, reselection, or the like) with high a quality of experience (QoE), a user equipment (UE) has to have the capability to measure surrounding cells and provide related data to the network (NW). The UE may need measurement gaps (MG) to perform measurements when it cannot measure the target frequency while simultaneously transmitting/receiving on the serving cell.

Generally, the UE may be configured by the NW to use one or more MG patterns. However, it may be desirable for the NW and/or the UE to have the flexibility to determine if some MGs shall be cancelled. For example, the NW may need to determine the priority of data scheduling and UE measurement and accordingly cancel one or more MGs.

Embodiments in the present disclosure relate to devices and methods for MG cancellation.

A method for a user equipment (UE) according to some embodiments of the present disclosure may comprise receiving, from a network (NW) device, measurement gap (MG) cancellation information associated with a particular MG of one or more MG patterns to be used by the UE; and determining whether the particular MG shall be cancelled based on the MG cancellation information.

A user equipment (UE) according to some embodiments of the present disclosure may comprise processor circuitry configured to cause the UE to perform the method as mentioned above for the UE.

A method for a network (NW) device according to some embodiments of the present disclosure may comprise transmitting, to a user equipment (UE), measurement gap (MG) cancellation information associated with a particular MG of one or more MG patterns to be used by the UE, the MG cancellation information comprising one or more network scheduling configuration (NSC) signals prior to the particular MG; and determining whether the particular MG shall be cancelled based on the MG cancellation information by determining whether there is any collision between the particular MG and transmissions to/from the wireless device scheduled by any of the one or more NSC signals.

A method for a network (NW) device according to some embodiments of the present disclosure may comprise determining whether a particular measurement gap (MG) of one or more MG patterns to be used by a user equipment (UE) shall be cancelled; and transmitting, to the UE, MG cancellation information associated with the particular MG, the MG cancellation information comprising an indicator in a downlink control command to explicitly indicate whether the particular MG of the one or more MG patterns shall be cancelled.

A network (NW) device according to some embodiments of the present disclosure may comprise processor circuitry configured to cause the NW device to perform the method the method as mentioned above for the NW.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flowchart diagram illustrating an example method for a NW device, according to some embodiments.

DETAILED DESCRIPTION

Exemplary Terminology

Figure 1:
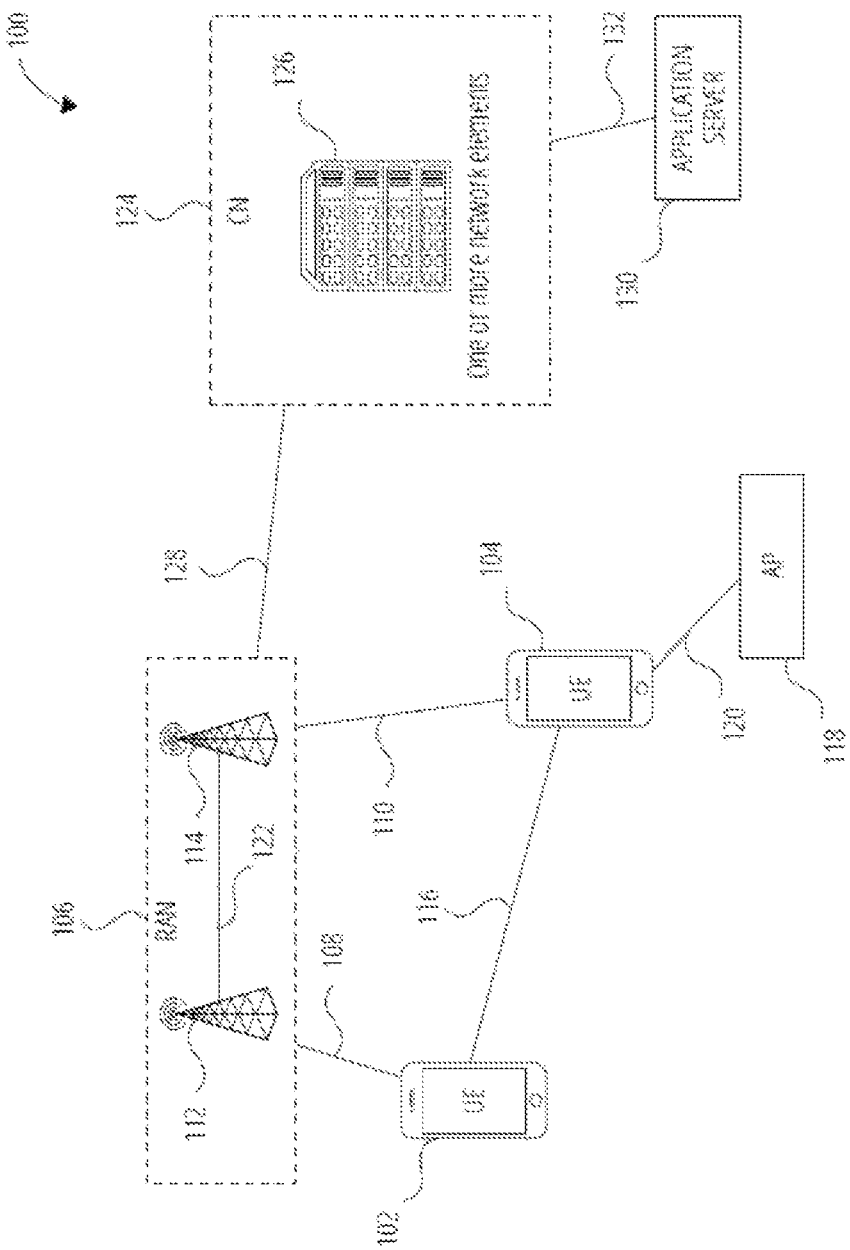
FIG. 1 illustrates an example architecture of a wireless communication system, according to embodiments disclosed herein.

For the purposes of the present document, the following terms and definitions are applicable to the examples and embodiments discussed herein, but are not meant to be limiting.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry".

The term "user equipment" (UE) (or "UE device") as used herein refers to, is part of, or includes any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

The term "base station" has the full breadth of its ordinary meaning, and at least includes a wireless communication station installed at a fixed location and used to communicate as part of a wireless telephone system or radio system.

The term "network element" as used herein refers to physical or virtualized equipment and/or infrastructure used to provide wired or wireless communication network services. The term "network element" may be considered synonymous to and/or referred to as a network device, networked computer, networking hardware, network equipment, network node, router, switch, hub, bridge, radio network controller, RAN device, RAN node, gateway, server, virtualized VNF. NFVI, and/or the like. The term "base station" may be considered synonymous to, and may be referred to as, "network element".

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "band" has the full breadth of its ordinary meaning, and at least includes a section of spectrum (e.g., radio frequency spectrum) in which channels are used or set aside for the same purpose.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

The phrase "in various embodiments". "in some embodiments", and the like may refer to the same, or different, embodiments. The terms "comprising". "having", and "including" are synonymous, unless the context dictates otherwise. The phrase "A and/or B" means (A), (B), or (A and B). The phrases "A/B" and "A or B" mean (A), (B), or (A and B), similar to the phrase "A and/or B". For the purposes of the present disclosure, the phrase "at least one of A and B" means (A), (B), or (A and B). The description may use the phrases "in an embodiment", "in embodiments". "in some embodiments", and/or "in various embodiments", which may each refer to one or more of the same or different embodiments. Furthermore, the terms "comprising", "including", "having", and the like, as used with respect to embodiments of the present disclosure, are synonymous.

In the following detailed description, numerous specific details are set forth to provide a thorough understanding of the described exemplary embodiments. It will be apparent, however, to one skilled in the art that the described embodiments can be practiced without some or all of these specific details. In other exemplary embodiments, well known structures or process steps have not been described in detail in order to avoid unnecessarily obscuring the concept of the present disclosure.

Communication System

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

FIG. 1 illustrates an example architecture of a wireless communication system 100, according to embodiments disclosed herein. The following description is provided for an example wireless communication system 100 that operates in conjunction with the LTE system standards and/or 5G or NR system standards as provided by 3GPP technical specifications.

As shown by FIG. 1, the wireless communication system 100 includes UE 102 and UE 104 (although any number of UEs may be used). In this example, the UE 102 and the UE 104 are illustrated as smartphones (e.g., handheld touchscreen mobile computing devices connectable to one or more cellular networks), but may also comprise any mobile or non-mobile computing device configured for wireless communication.

The UE 102 and UE 104 may be configured to communicatively couple with a RAN 106. In embodiments, the RAN 106 may be NG-RAN, E-UTRAN, etc. The UE 102 and UE 104 utilize connections (or channels) (shown as connection 108 and connection 110, respectively) with the RAN 106, each of which comprises a physical communications interface. The RAN 106 can include one or more base stations, such as base station 112 and base station 114, that enable the connection 108 and connection 110.

In this example, the connection 108 and connection 110 are air interfaces to enable such communicative coupling, and may be consistent with RAT(s) used by the RAN 106, such as, for example, an LTE and/or NR.

In some embodiments, the UE 102 and UE 104 may also directly exchange communication data via a sidelink interface 116. The UE 104 is shown to be configured to access an access point (shown as AP 118) via connection 120. By way of example, the connection 120 can comprise a local wireless connection, such as a connection consistent with any IEEE 802.11 protocol, wherein the AP 118 may comprise a Wi-Fi® router. In this example, the AP 118 may be connected to another network (for example, the Internet) without going through a CN 124.

In embodiments, the UE 102 and UE 104 can be configured to communicate using orthogonal frequency division multiplexing (OFDM) communication signals with each other or with the base station 112 and/or the base station 114 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 112 or base station 114 may be implemented as one or more software entities running on server computers as part of a virtual network. In addition, or in other embodiments, the base station 112 or base station 114 may be configured to communicate with one another via interface 122. In embodiments where the wireless communication system 100 is an LTE system (e.g., when the CN 124 is an EPC), the interface 122 may be an X2 interface. The X2 interface may be defined between two or more base stations (e.g., two or more eNBs and the like) that connect to an EPC, and/or between two eNBs connecting to the EPC. In embodiments where the wireless communication system 100 is an NR system (e.g., when CN 124 is a 5GC), the interface 122 may be an Xn interface. The Xn interface is defined between two or more base stations (e.g., two or more gNBs and the like) that connect to 5GC, between a base station 112 (e.g., a gNB) connecting to 5GC and an eNB, and/or between two eNBs connecting to 5GC (e.g., CN 124).

The RAN 106 is shown to be communicatively coupled to the CN 124. The CN 124 may comprise one or more network elements 126, which are configured to offer various data and telecommunications services to customers/subscribers (e.g., users of UE 102 and UE 104) who are connected to the CN 124 via the RAN 106. The components of the CN 124 may be implemented in one physical device or separate physical devices including components to read and execute instructions from a machine-readable or computer-readable medium (e.g., a non-transitory machine-readable storage medium).

In embodiments, the CN 124 may be an EPC, and the RAN 106 may be connected with the CN 124 via an S1 interface 128. In embodiments, the S1 interface 128 may be split into two parts, an S1 user plane (S1-U) interface, which carries traffic data between the base station 112 or base station 114 and a serving gateway (S-GW), and the S1-MME interface, which is a signaling interface between the base station 112 or base station 114 and mobility management entities (MMEs).

In embodiments, the CN 124 may be a 5GC, and the RAN 106 may be connected with the CN 124 via an NG interface 128. In embodiments, the NG interface 128 may be split into two parts, an NG user plane (NG-U) interface, which carries traffic data between the base station 112 or base station 114 and a user plane function (UPF), and the S1 control plane (NG-C) interface, which is a signaling interface between the base station 112 or base station 114 and access and mobility management functions (AMFs).

Generally, an application server 130 may be an element offering applications that use internet protocol (IP) bearer resources with the CN 124 (e.g., packet switched data services). The application server 130 can also be configured to support one or more communication services (e.g., VoIP sessions, group communication sessions, etc.) for the UE 102 and UE 104 via the CN 124. The application server 130 may communicate with the CN 124 through an IP communications interface 132.

Figure 2:
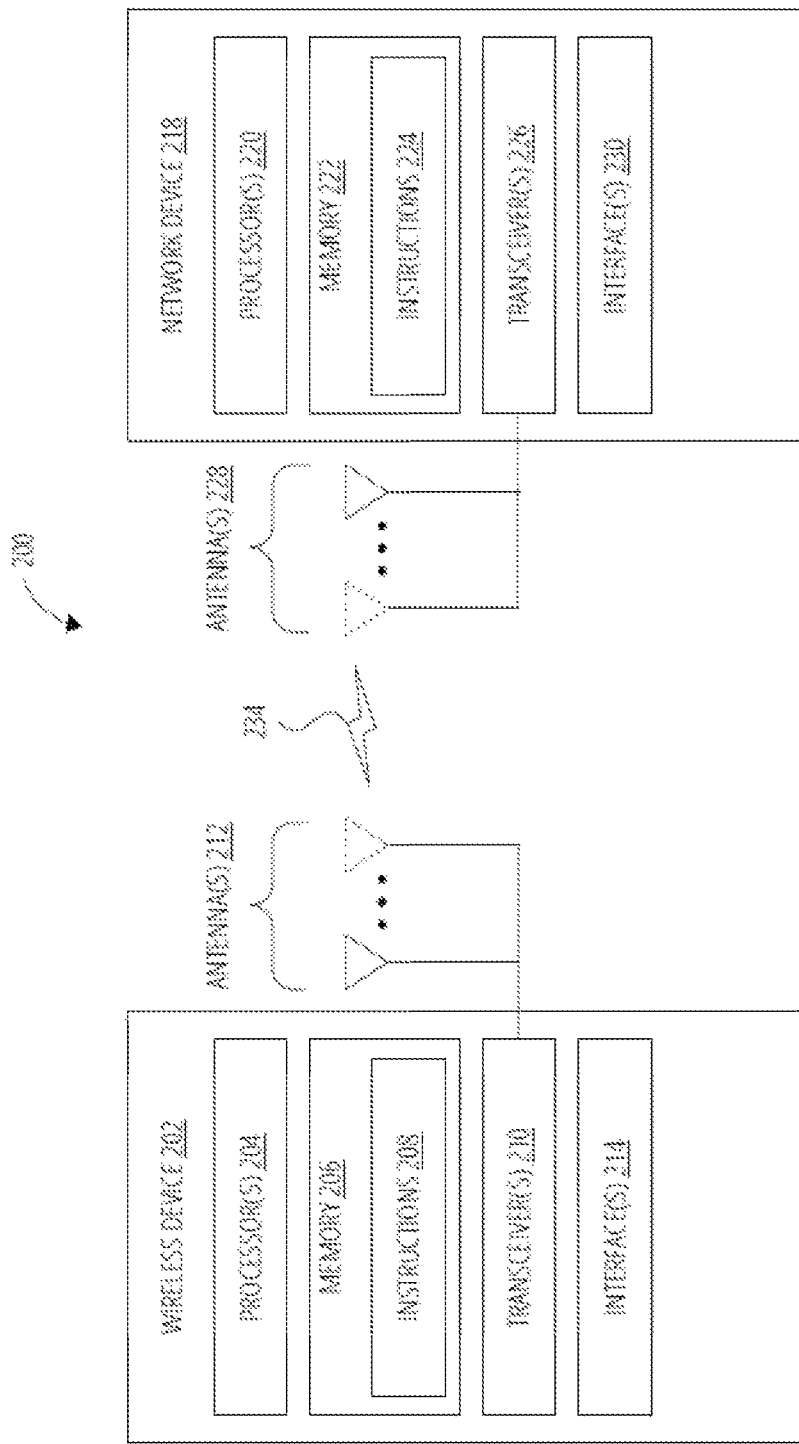
FIG. 2 illustrates a system for performing signaling between a wireless device and a network device, according to embodiments disclosed herein.

FIG. 2 illustrates a system 200 for performing signaling 234 between a wireless device 202 and a network device 218, according to embodiments disclosed herein. The system 200 may be a portion of a wireless communications system as herein described. The wireless device 202 may be, for example, a UE of a wireless communication system. The network device 218 may be, for example, a base station (e.g., an eNB or a gNB) of a wireless communication system.

The wireless device 202 may include one or more processor(s) 204. The processor(s) 204 may execute instructions such that various operations of the wireless device 202 are performed, as described herein. The processor(s) 204 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 202 may include a memory 206. The memory 206 may be a non-transitory computer-readable storage medium that stores instructions 208 (which may include, for example, the instructions being executed by the processor(s) 204). The instructions 208 may also be referred to as program code or a computer program. The memory 206 may also store data used by, and results computed by, the processor(s) 204.

The wireless device 202 may include one or more transceiver(s) 210 that may include radio frequency (RF) transmitter and/or receiver circuitry that use the antenna(s) 212 of the wireless device 202 to facilitate signaling (e.g., the signaling 234) to and/or from the wireless device 202 with other devices (e.g., the network device 218) according to corresponding RATs.

The wireless device 202 may include one or more antenna(s) 212 (e.g., one, two, four, or more). For embodiments with multiple antenna(s) 212, the wireless device 202 may leverage the spatial diversity of such multiple antenna(s) 212 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 202 may be accomplished according to precoding (or digital beamforming) that is applied at the wireless device 202 that multiplexes the data streams across the antenna(s) 212 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 202 may implement analog beamforming techniques, whereby phases of the signals sent by the antenna(s) 212 are relatively adjusted such that the (joint) transmission of the antenna(s) 212 can be directed (this is sometimes referred to as beam steering).

The wireless device 202 may include one or more interface(s) 214. The interface(s) 214 may be used to provide input to or output from the wireless device 202. For example, a wireless device 202 that is a UE may include interface(s) 214 such as microphones, speakers, a touchscreen, buttons, and the like in order to allow for input and/or output to the UE by a user of the UE. Other interfaces of such a UE may be made up of made up of transmitters, receivers, and other circuitry (e.g., other than the transceiver(s) 210/antenna(s) 212 already described) that allow for communication between the UE and other devices and may operate according to known protocols (e.g., Wi-Fi®, Bluetooth®, and the like).

The network device 218 may include one or more processor(s) 220. The processor(s) 220 may execute instructions such that various operations of the network device 218 are performed, as described herein. The processor(s) 204 may include one or more baseband processors implemented using, for example, a CPU, a DSP, an ASIC, a controller, an FPGA device, another hardware device, a firmware device, or any combination thereof configured to perform the operations described herein.

The network device 218 may include a memory 222. The memory 222 may be a non-transitory computer-readable storage medium that stores instructions 224 (which may include, for example, the instructions being executed by the processor(s) 220). The instructions 224 may also be referred to as program code or a computer program. The memory 222 may also store data used by, and results computed by, the processor(s) 220.

The network device 218 may include one or more transceiver(s) 226 that may include RF transmitter and/or receiver circuitry that use the antenna(s) 228 of the network device 218 to facilitate signaling (e.g., the signaling 234) to and/or from the network device 218 with other devices (e.g., the wireless device 202) according to corresponding RATs.

The network device 218 may include one or more antenna(s) 228 (e.g., one, two, four, or more). In embodiments having multiple antenna(s) 228, the network device 218 may perform MIMO, digital beamforming, analog beamforming, beam steering, etc., as has been described.

The network device 218 may include one or more interface(s) 230. The interface(s) 230 may be used to provide input to or output from the network device 218. For example, a network device 218 that is a base station may include interface(s) 230 made up of transmitters, receivers, and other circuitry (e.g., other than the transceiver(s) 226/antenna(s) 228 already described) that enables the base station to communicate with other equipment in a core network, and/or that enables the base station to communicate with external networks, computers, databases, and the like for purposes of operations, administration, and maintenance of the base station or other equipment operably connected thereto.

Among other things, embodiments described herein are directed to measurement gaps (MGs) for new radio (NR) systems. Embodiments of the present disclosure may be utilized in conjunction with measurements performed by a UE, including intra-frequency and inter-frequency radio resource management (RRM) measurements. In a MG, a UE may perform measurement operation for a specific signal/parameter/indicator that is usually performance related, such as reference signals (RSs) including but not limited to synchronization signal (SS)/physical broadcast channel (PBCH) block (SSB), positioning reference signal (PRS) or Channel Status Information Reference Signal (CSI-RS).

A UE may be configured by a network (NW) device with one or more measurement gap (MG) patterns. "MG pattern" as used herein may refer to a set of MGs with identical measurement gap lengths (MGLs), measurement gap repetition periods (MGRPs), measurement gap timing advances (MGTAs), measurement gap offsets and the like for the same measurement objective (MO). Note that herein "MG pattern" actually encompass any kind of MG pattern/configuration, any kind of specification/rule for guiding/setting MG operation or similar measurement operation, or any other kind of measurement operation mode/manner, unless otherwise specified.

MG patterns for a particular UE may be configured based on the frequency ranges (FRs) in which the UE operates. Frequency bands for NR may be separated into two or more different frequency ranges, Two frequency ranges (FR1 and FR2) in which NR can operate according to the present version of the specification are identified in the below table (Table 1) as described in clause 5.1 of TS 38.104. For example, FR1 may include frequency bands operating in sub-6 GHz frequencies, some of which are bands that may be used by previous standards. Bands in the millimeter wave (mm Wave) range of FR2 may have smaller coverage but potentially higher available bandwidth than bands in the FR1. Skilled persons will recognize these frequency ranges, which are provided by way of example, may change from time to time or from region to region.

TABLE 1

Definition of frequency ranges

| Frequency range (FR) designation | Corresponding frequency range |
| --- | --- |
| FR1 | 410 MHz-7125 MHz |
| FR2 | 24250 MHz-52600 MHz |

Figure 6A:
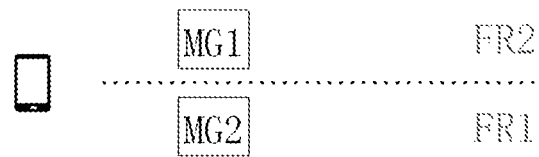
FIGS. 6A through 6D are diagrams illustrating MG patterns supported by UEs for each frequency range (FR).
Figure 6B:
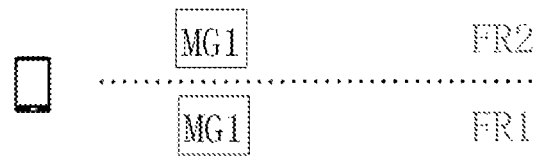

According to 3GPP specification Release 15 or 16, the independentGapConfig information element (IE) indicates whether the UE supports two independent MG configurations for FR1 and FR2, i.e., whether the UE supports per-FR gap. Only one MG pattern may be configured for a UE that does not support per-FR gap, as shown in FIG. 6B. Even for UE supporting per-FR gap, only one MG pattern may be configured for each FR, as shown in FIG. 6A, although different MG patterns may be configured for different FRs.

According to 3GPP specification Release 17, a UE may support concurrent MG patterns. Concurrent MG patterns may be configured for a UE by a NW in response to the UE supports concurrent MG patterns. The term "concurrent MG patterns" as used herein refers to multiple MG patterns configured for one UE to perform one or more measurements in the same time period. A UE is configured with multiple concurrent MG patterns in the same time period, and these MG patterns are independent of each other. Any two of the multiple concurrent MG patterns may have different pattern configurations or have an identical pattern configuration, including MGL, MGRP, MGTA and the like. The UE may use one of concurrent MG patterns to perform one measurement and use another of the concurrent MG patterns to perform another measurement, may use one or more of the concurrent MG patterns to perform one measurement, or may use one of the concurrent MG patterns to perform one or more measurements.

Figure 6C:
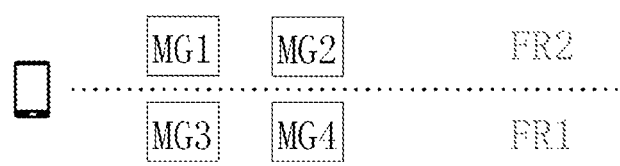
Figure 6D:
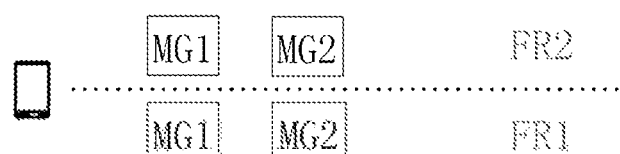

For a UE supports per-FR gap and concurrent MG patterns, the UE may be configured with multiple concurrent MG patterns for each FR, as shown in FIG. 6C. For a UE does not support per-FR gap but supports concurrent MG patterns, the UE may be configured with multiple concurrent MG patterns and these patterns are suitable for both FR1 and FR2, as shown in FIG. 6D. It should be noted that in FIGS. 6A through 6D, the marks MG1, MG2, MG3 and MG4 represent four different MG patterns, respectively.

However, it doesn't mean a MG may be arbitrarily used by a UE to perform measurement operation without any restriction. Sometimes the NW device and the UE may need to cancel a configured MG in view of network scheduling configuration or for other considerations. Situations where a MG is determined to be cancelled or not are discussed in detail below.

Situation 1: Single MG Considered

Considering a particular MG of one or more MG patterns configured for a UE, the MG may need to be cancelled, e.g. for network scheduling collision reasons or other reasons. The NW device may indicate to the UE whether the particular MG shall be cancelled in an implicit or explicit way. No matter whether the indication is implemented in the implicit or explicit way, the indication sent from the NW device to the UE so as to enable the UE to determine whether a particular MG shall be cancelled may be referred to herein as "MG cancellation information". The MG cancellation information may be associated with the particular MG of the one or more MG patterns in a way that it is intended for indicating whether the particular MG shall be cancelled. Upon receipt of the MG cancellation information, the UE may determine whether the particular MG shall be cancelled based on the MG cancellation information.

Option 1: Implicit Indication

According to some embodiments, the MG cancellation information may comprise one or more network scheduling configuration (NSC) signals prior to the particular MG. The NSC signals may be any signals sent from the NW to the UE prior to the particular MG to schedule transmissions to or from the UE. As the NSC signals indicate that some transmissions to/from the UE may occur, it is possible that the transmissions may at least partially coincide with the particular MG that has been configured at a time after the NSC signals. Accordingly, the UE may determine whether the particular MG shall be cancelled by determine whether there is any collision between the particular MG and transmissions to/from the UE scheduled by any of the NSC signals.

To determine the collision, the UE may need to know a time domain configuration of the particular MG and allocated time resource for the transmissions to/from the UE scheduled by any NSC signal. The time domain configuration of the particular MG is used to determine where the particular MG is located in time domain, including e.g., the offset of the MG and the lengths of the MG. In some embodiments, the one or more MG patterns to be used by the UE may be determined by the NW in advance and accordingly, configuration information for the MG patterns comprising the time domain configuration of the particular MG may be sent from the NW to the UE in advance. In some embodiments, the one or more MG patterns to be used by the UE may be set by a specification commonly followed by both the UE and the NW, and the specification also define configuration for the MG patterns comprising the time domain configuration of the particular MG. In some embodiments, UE may send a message to the NW to indicate the one or more MG patterns it supports as well as the configuration for the MG patterns comprising the time domain configuration of the particular MG. The allocated time resource for the transmissions to/from the UE is used to determine where the transmissions to/from the UE are located in time domain, including e.g., the start time of the transmissions and optionally the durations of the transmissions. In some embodiments, the NSC signals may explicitly indicate the allocated time resource for the transmissions to/from the UE. For example, the NSC signals may clearly specify the start time of the transmissions, and optionally, the durations of the transmissions. In some embodiments, the NSC signals may implicitly indicate the allocated time resource for the transmissions to/from the UE. For example, the time offset between the occurrence of an NSC signal and the transmissions scheduled by the NSC signal may be predefined and known to the UE in advance. Upon receipt of the NSC signal, the UE may calculate the time for the transmissions scheduled by the NSC signal based on time of receipt of the NSC signal and the predefined time offset.

Upon knowing the time domain configuration of the particular MG and allocated time resource for the transmissions to/from the UE scheduled by any NSC signal, the UE is able to determine if there is any collision therebetween. If the particular MG overlaps with any part of the transmissions to/from the UE, the UE determines that there is a collision. Then the UE may determine that the particular MG shall be cancelled. As a response, the UE shall cancel the particular MG to skip measurement. In some embodiments, the UE shall further keep monitoring the transmissions to/from the UE during the particular MG. If the particular MG does not overlap with any part of the transmissions to/from the UE, the UE determines that there is no collision. Then the UE may determine that the particular MG shall not be cancelled. As a response, the UE shall perform measurement in the particular MG. In some embodiments, the UE shall further stop monitoring the transmissions to/from the UE during the particular MG.

The NW may perform a similar procedure to determine if there is a collision between the particular MG and the transmissions to/from the wireless device scheduled by any of the one or more NSC signals. The time domain configuration of the particular MG and allocated time resource for the transmissions to/from the UE scheduled by any NSC signal are known to the NW because either (1) the MG patterns to be used by the UE are determined by or notified to the NW, and the time resource for the transmissions to/from the UE scheduled by any NSC signal are allocated by the NW, or (2) the time domain configuration of the particular MG and allocated time resource for the transmissions to/from the UE scheduled by any NSC signal are determined by a specification on which a consensus between the UE and the NW is reached. Upon knowing the time domain configuration of the particular MG and allocated time resource for the transmissions to/from the UE scheduled by any NSC signal, the NW is able to determine if there is any collision therebetween. If the particular MG overlaps with any part of the transmissions to/from the UE, the NW determines that there is a collision. Then the NW may determine that the particular MG shall be cancelled. As a response, the NW is allowed to keep schedule the UE, e.g., implement the transmissions to/from the UE during the particular MG. On the UE side, as discussed above, since the UE also determines to cancel the particular MG, it would not carry out measurement operations, but keep monitoring transmissions to/from the UE during the particular MG. Therefore, both the UE and the NW would be able to fulfill the transmissions between them. If the particular MG does not overlap with any part of the transmissions to/from the UE, the NW determines that there is no collision. Then the NW may determine that the particular MG shall not be cancelled. As a response, the NW shall not schedule the UE during the particular MG, i.e., would not request the UE to fulfill any transmissions to/from the UE during the MG.

It would be advantageous if the NW makes the same determination of the collision with the UE, because in this way they may take coordinated actions to avoid the collision. For example, both the NW and the UE determine that there is a collision, and both take actions to cancel the particular MG, so that the collision would not actually happen. Otherwise, if the outcomes of the determination of the collision made by the NW and the UE are different, they may perform uncoordinated actions that still result in the collision.

According to some embodiments, the one or more NSC signals may comprise Downlink Control Information (DCI) signals. DCI signals are control information carried in a Physical Downlink Control Channel (PDCCH) and used to indicate uplink (UL) resource allocation and/or descriptions about downlink (DL) data transmitted to the UE. For example, some DCI signals comprise a set of information required to schedule Physical Downlink Shared Channel (PDSCH) signals or Physical Uplink Shared Channel (PUSCH) signals. In response to receiving PDSCH signals, the UE may usually need to send responses such as an Acknowledgement (ACK)/Negative Acknowledgement (NACK) in Physical Uplink Control Channel (PUCCH) signals for the PDSCH signals. Therefore, the responses in PUCCH signals for the PDSCH signals may also regarded as being scheduled by the DCI signals. Accordingly, the transmissions to/from the UE scheduled by the DCI signals may comprise at least one of: PDSCH signals scheduled by the DCI signals: responses carried in PUCCH signals for the PDSCH signals; or PUSCH signals scheduled by the DCI signals.

Figure 7A:
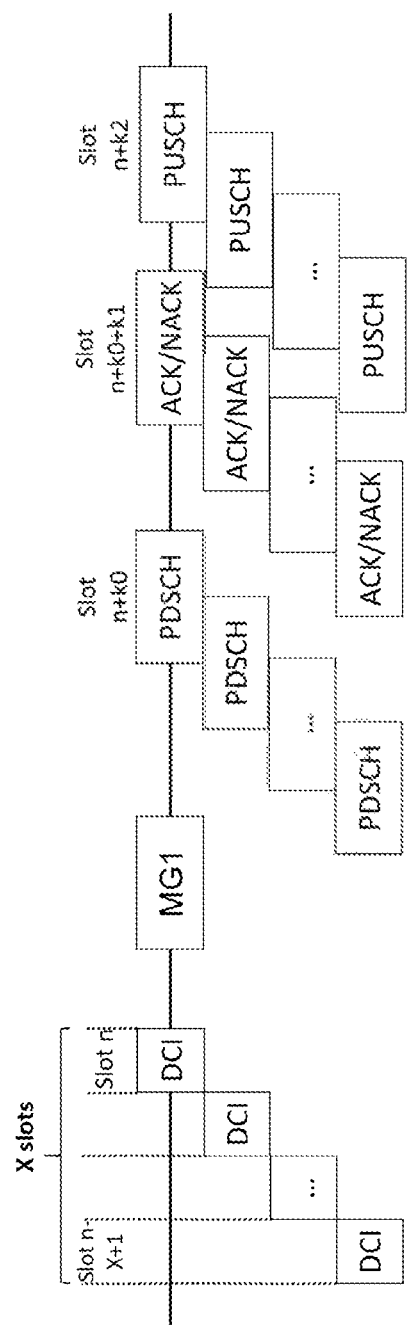
FIGS. 7A and 7B illustrate MG cancellation based on an implicit indication according to some embodiments.
Figure 7B:
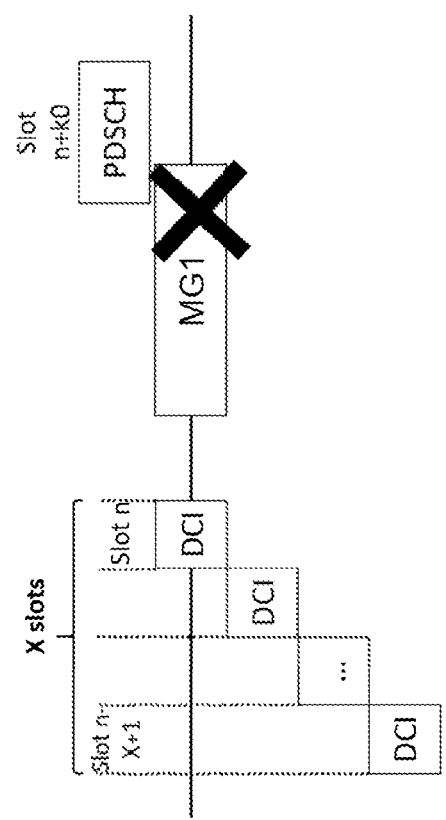

FIGS. 7A and 7B illustrate MG cancellation based on an implicit indication according to some embodiments. As shown in the example of FIGS. 7A and 7B, the UE and the NW use resource allocation in time domain and ACK/NACK response timing to implicitly indicate the cancellation of a particular MG. Specifically, the UE and the NW each determines if there is a collision between the particular MG (e.g., "MG1") and the transmissions to/from the UE including the PDSCH signals, the ACKs/NACKs for the PDSCH signals and the PUSCH signals scheduled by the DCI signals. The UE checks DCI signals for up to X slots before MG1. For a DCI signal in each of the X slots, the UE determines if the DCI signal is used to schedule any PDSCH signal or PUSCH signal. If any PDSCH or PUSCH signal is scheduled by the DCI signal, the UE then calculates the allocated time slot(s) for the scheduled signals based on the three respective time interval configuration, i.e. k0, k1 and k2. The definitions for the there time interval configuration are listed as below.

TABLE 1

Definitions for k0, k1 and k2

| Time interval configuration | Definition |
| --- | --- |
| k0 | Slot offset between a DCI signal and its scheduled PDSCH signal (see TS 38.214 [19], clause 5.1.2.1) |
| k1 | Time gap between PDSCH signals and the reception of the PUCCH signals that carry ACKs/NACKs for the PDSCH signals (defined in information element (IE) 'dl-DataToUL-ACK' or 'dl-DataToUL-ACK-DCI-1-2') |
| k2 | Time delay between a DCI signal and its scheduled PUSCH signal |

The values for the three respective time interval configuration may be predefined by a specification commonly followed by the UE and the NW or may be determined by the NW and notified to the UE.

As shown in FIG. 7A, for example, if DCI signal in Slot n schedules a PDSCH signal (and thus an ACK/NACK) and/or a PUSCH signal, the UE may determine that the PDSCH signal is allocated in Slot n+k0, the ACK/NACK is allocated in Slot n+k0+k1, and the PUSCH signal is allocated in Slot n+k2. Here, Slot n may be a slot for DCI signals that is the closest to MG1 among all the slots for DCI signals prior to MG1. In other words, Slot n is a slot for DCI immediately before MG1. Similarly, the UE may determine the allocated time resource for any signals scheduled by the DCI signals in the X slots for DCI before MG1. Then the UE may compare MG1 with all the scheduled signals by DCI signals in the X slots to see if MG1 at least partially overlaps in time domain with any of the scheduled signals.

If it is determined that any scheduled signal by any of the DCI signal in the X slots at least partially overlap with MG1, the UE determines that there is a collision for MG1 and further determines to cancel MG1. As shown in FIG. 7B, the PDSCH signal in Slot n+k0 scheduled by DCI signal in Slot n overlaps with a part of MG1 in time domain and thus MG1 is cancelled.

It should be recognized that although in the description with respect to FIGS. 7A and 7B, operations are recited as being performed by the UE, they can also performed by the NW in the same way.

According to some embodiments, the number of the one or more NSC signals to be checked for determination of MG cancellation can be determined based on the scheduling range in time domain by each NSC signal. That is, how long ahead would the NSC signal be able to schedule signals. The number of NSC signals to be checked would be large if the scheduling range of NSC signal is far. In some embodiments, the scheduling range by the NSC signal can be determined based on the three respective time interval configuration k0, k1 and k2 as discussed above.

Since the particular MG may be cancelled in a case of determined collision, additional delay can be expected in RRM measurement latency for the measurement objective (MO) configured to be measured in the particular MG. For instance, for a MG pattern for a particular MO, if the MGRP for the MG pattern is not less than a SSB Measurement Timing Configuration (SMTC) period, the measurement delay shall be extended by Y, which is the number of dropped MGs configured to be used for the MO, during the measurement period of T SSB measurement period inter, which can be calculated in the table below (Table 2) by taking measurement period in FR1 for inter-frequency case for example. If the MGRP is less than the SMTC period, then the UE shall try the rest of MGs following the same rules. Whether additional delay is allowed depends on the availability of the MGs for measurement of the MO during the SMTC periodicity.

TABLE 2

Measurement period for inter-frequency measurements with gaps (Frequency FR1)

| Condition $^{NOTE1,2}$ | $T_{SSB\_measurement\_period\_inter}$ |
|---|---|
| No DRX | Max(200 ms, (8 + Y) × Max(MGRP, SMTC period)) × $CSSF_{inter}$ |
| DRX cycle ≤320 ms | Max(200 ms, Ceil((8 + Y) × 1.5) × Max(MGRP, SMTC period, DRX cycle)) × $CSSF_{inter}$ |
| DRX cycle >320 ms | (8 + Y) × DRX cycle × $CSSF_{inter}$ |

NOTE1:
DRX or non DRX requirements apply according to the conditions described in clause 3.6.1
NOTE2:
In EN-DC operation, the parameters, timers and scheduling requests referred to in clause 3.6.1 are for the secondary cell group. The DRX cycle is the DRX cycle of the secondary cell group.

It can be recognized that measurement latency is calculated separately per MG. Thus the extension of latency for each MG shall be based on the associated dropped MG occasions. For example, if the UE is configured with three MG patterns, i.e., MG pattern #1, MG pattern #2, and MG pattern #3, and MG pattern #1 is used for measuring MO1, and assuming two MGs in MG pattern #1 are dropped and three MGs in MG pattern #2 are dropped during the measurement period of MO1, then the number of dropped MGs Y to be used in calculating the latency for MO1 shall be two, other than three. In other words, in this case, Y is determined by the dropped MGs of MG pattern #1, rather than the dropped MGs of MG pattern #2.

Option 2: Explicit Indication

According to some embodiments, the MG cancellation information may comprise an indicator in a downlink control command to explicitly indicate whether the particular MG of the one or more MG patterns shall be cancelled. The downlink control command carrying such an indicator may be in a form of physical-layer control command or a Medium Access Control (MAC)-layer control command. For example, the physical-layer control command may be a new DCI command or may be implemented by reusing some of the existing DCI command as defined in TS 38.212. For example, the MAC-layer control command may be a MAC-CE.

According to some embodiments, the downlink control command may be in a slot immediately before the particular MG, or may be in a slot by a number of slots ahead of the particular MG as long as the downlink control command can clearly indicate which MG(s) is to be cancelled. For example, the downlink control command and the particular MG(s) may be intervened by several other MGs.

According to some embodiment, the indicator in the downlink control command may include a flag for the particular MG. For example, if the flag for the particular MG is set, the UE may interpret that the particular MG shall not be cancelled, and if the flag is clear, the UE may interpret that the particular MG shall be cancelled.

According to some embodiment, the indicator in the downlink control command may include a bitmap string with each bit corresponding to a MG of a number of MGs comprising the particular MG after a slot for the downlink control command. For example, if the indicator is a bitmap string like {1, 1, 0, 0, . . . , 0, 0}, the UE may interpret that the first and second MGs after the slot for the downlink control command shall not be cancelled and the rest N−2 MGs (where N equals a lengths of the bitmap string) after the slot for the downlink control command shall be cancelled.

According to some embodiment, prior to transmitting the MG cancellation information comprising the indicator to the UE, the NW first determines whether the particular MG shall be cancelled. The NW may determine whether the particular MG shall be cancelled based on various considerations. In some embodiments, the NW may perform the operations as discussed above in Option 1 to determine if there is a collision between the particular MG and any scheduled transmissions to/from the UE. In response to a determination that there is a collision, the NW may configure the MG cancellation information such that it comprises an indicator to explicitly indicate that the particular MG shall be cancelled. In response to a determination that there is no collision, the NW may configure the MG cancellation information such that it comprises an indicator to explicitly indicate that the particular MG shall not be cancelled.

In some further embodiments, the NW may take into account a priority of data scheduling and UE measurement. For example, if the UE measurement is prioritized, even if the NW determines there is a collision e.g., by using the methods as discussed above, the NW may still determine that the particular MG shall not be cancelled, and thus configure the MG cancellation information such that it comprises an indicator to explicitly indicate that the particular MG shall not be cancelled. As a contrary example, if the data scheduling is prioritized, even if the NW determines there is no collision, the NW may still determine that the particular MG shall be cancelled, and thus configure the MG cancellation information such that it comprises an indicator to explicitly indicate that the particular MG shall be cancelled.

In some further embodiments, the NW may make a tradeoff between improved efficiency of data scheduling and measurement delay caused by cancelling or skipping some MGs. Specifically, the NW may determine to cancel or skip several MGs to improve the efficiency of data scheduling. But if too many MGs are cancelled, the measurement delay would be severe or intolerable. To address this, the NW may calculate the measurement delay based on the number of cancelled MGs, e.g. by using the expressions in Table 2 and determine that no more MGs shall be cancelled in order to limit the measurement delay to be no greater than a delay threshold. Accordingly, the NW may include a bitmap string in the downlink control command as the MG cancellation information so as to indicate to the UE a maximum number of MGs that shall be cancelled.

Figure 8:
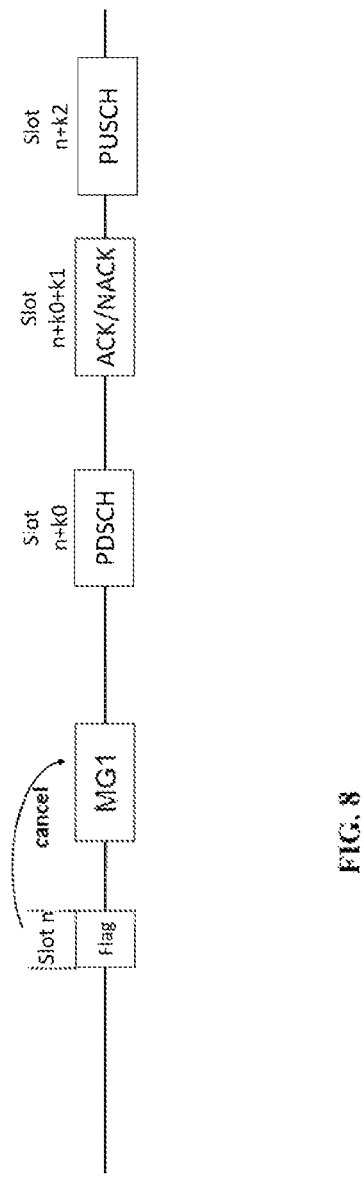
FIG. 8 illustrates MG cancellation based on an explicit indication according to some embodiments.

Compared with Option 1, the UE shall determine whether to cancel the particular MG according to the indicator int the downlink control command, regardless whether there is a collision between the particular MG and the transmissions to/from the wireless device scheduled by any NSC signal. For instance, as shown in FIG. 8, even if there is no overlapping between MG1 and the scheduled PDSCH signal in Slot n+k0, corresponding ACK/NACK in Slot n+k0+k1, and PUSCH signal in Slot n+k2, if the flag in Slot n indicates that MG1 shall be cancelled, the UE will determine that MG1 shall be cancelled or dropped.

In Option 2, in response to the UE and the NW respectively determining whether to cancel the particular MG, the actions respectively taken by the UE and the NW are identical to those taken by the UE and the NW in Option 1. For example, if the UE determines that the particular MG shall be cancelled, it shall cancel the particular MG to skip measurement and may further keep monitoring PDCCH for data scheduling signals during the particular MG. If the NW determines that the particular MG shall be cancelled, it is allowed to keep data scheduling with the UE during the particular MG. If the UE determines that the particular MG shall not be cancelled, it shall perform measurement in the particular MG. In this case, the UE does not need to monitor the PDCCH for data scheduling signals during the particular MG. If the NW determines that the particular MG shall not be cancelled, it shall suspend data scheduling with the UE during the particular MG.

Situation 2: Two Non-Overlapping MGs Considered

As discussed above, the UE may be configured with concurrent MG patterns. Considering two successive MGs of which the first MG is from a first MG pattern of the concurrent MG patterns and the successive, second MG is from a second MG pattern of the concurrent MG patterns.

Figure 9:
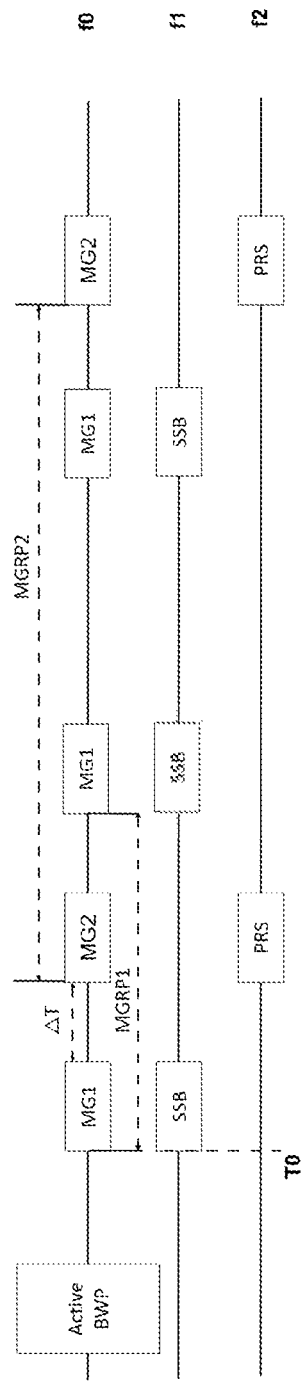
FIG. 9 illustrates two non-overlapping MGs from concurrent MG patterns according to some embodiments.

In some embodiments, the first MG does not overlap in time domain with the second MG. FIG. 9 shows a typical usage of concurrent MG patterns including two successive MGs that are non-overlapping. In the shown example, a UE is working on carrier f0, or, more specifically, on an active bandwidth part (BWP). The UE is configured with two measurement objectives, including SSB based L3 measurement on carrier f1 and PRS measurement for positioning purpose on carrier f2.

Two concurrent and independent MG patterns are configured for the UE. The MGs having a first gap pattern from the two concurrent MG patterns are marked as MG1 in the figure. Since the MGs marked as MG1 (referred to as "MG1" hereinafter for simplicity) are used for the SSB based measurement as shown in the figure, the gap pattern configuration of MG1 is match the configuration of SSB. That is, the MGL of MG1 will cover the SSB duration (the term "cover" as used herein includes the meaning that the RS duration completely falls into the MG, and the length of the MG is greater than the duration in order to tune the RF to operate on the target frequency), and the MGRP will correspond to the SSB transmission periodicity (referred to as "MGRP1"). The MGs having a second gap pattern from the two concurrent MG patterns marked as MG2 (referred to as "MG2" hereinafter for simplicity) are used for the PRS measurement, and then the MGL of MG2 will cover the PRS duration and the MGRP of MG2 will correspond to the PRS transmission periodicity (referred to as "MGRP2"). As shown in the figure, since the time offsets and periodicity for MG1 and MG2 are different, they cannot be covered by one single MG pattern and hence two concurrent MG patterns are required.

Efforts can be taken such that the NW configures the concurrent MG patterns in a way that the MGs are not overlapping with each other. However, it is still possible that two successive MGs from different concurrent MG patterns are quite close to one another. Two aspects need to be considered in a time interval (referred to as "ΔT" for simplicity, as shown in FIG. 9) between the two successive MGs from different concurrent MG patterns.

Aspect 1): UE Processing Capability

When performing the measurement on a target reference signal (RS), the duration of an MG usually only allows the UE to buffer the data of the RS, that is, the UE does not have enough time to process the data (including demodulation and calculation) during the MG. Therefore, some additional time for data processing is needed after completing the RS data reception, for example, after the end of the MG occasion. In view of this, if multiple concurrent MG patterns are configured for the UE, the NW shall guarantee MG occasions according to an MG pattern are not too close to MG occasions according to another MG pattern. In some embodiments, the UE may introduce some new UE capability information to indicate a minimum interval (referred to as "$\Delta T_{min}$" for simplicity) it can support to the NW. In other words, the minimum interval is based on UE capability. The NW may configure the time interval between the two successive MGs from different concurrent MG patterns, i.e., ΔT, to be not less than the minimum interval $\Delta T_{min}$.

Aspect 2): Network Scheduling Configuration

Sometimes, even if the time interval ΔT is not less than the minimum interval $\Delta T_{min}$, i.e. the UE can support a short guard period, the time interval ΔT may still be too small that the NW may still not able to successfully schedule the UE. For example, the network scheduling configuration such as the time interval configuration k0, k1 and k2 need to be considered in ΔT. Therefore, the NW may need to consider whether the second MG of the two successive, concurrent MGs shall be cancelled, even if there is no overlap between the two successive, concurrent MGs.

Rules for the NW and the UE to determine whether the UE shall conduct measurement within the second MG of the two successive, concurrent MGs or the UE shall skip the second MG are discussed below.

The Option 1—implicit indication and Option 2—explicit indication as discussed above for the situation where one single MG is considered (Situation 1) also apply to the present situation of two non-overlapping, successive and concurrent MGs (Situation 2), with some appropriate variations.

Figure 10:
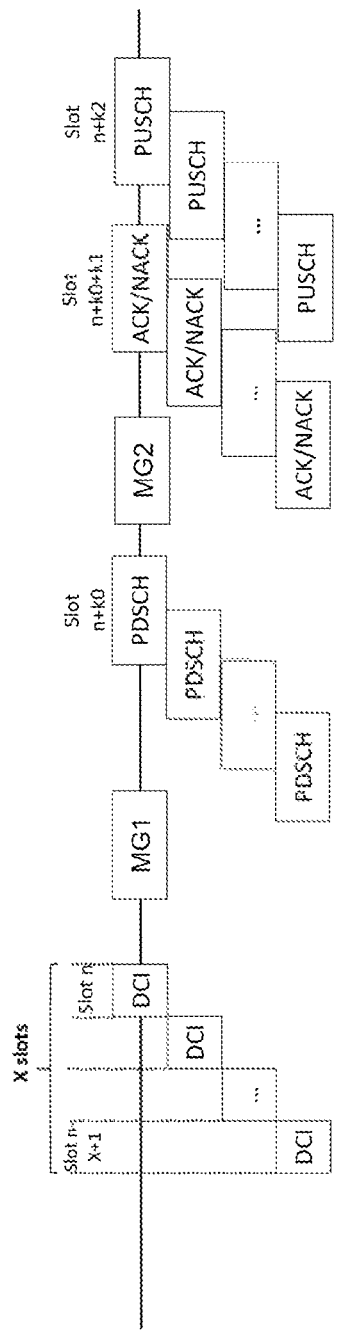
FIG. 10 illustrates MG cancellation based on an implicit indication for a MG of the two non-overlapping MGs according to some embodiments.

FIG. 10 illustrates an implicit indication scheme for cancellation of the second MG of the two overlapping, successive and concurrent MGs according to some embodiments. MG1 and MG2 are the two overlapping, successive and concurrent MGs. In these embodiments, the particular MG that the UE and the NW determine whether to cancel is MG2, i.e. the second one of the two overlapping, successive and concurrent MGs. The MG cancellation information received by the UE from the NW to determine whether MG2 shall be cancelled is prior to MG1, i.e. the first one of the two MGs. As the implicit indication scheme, like Option 1 for Situation 1 as discussed above with reference to FIG. 7A-7B, the MG cancellation information to implicitly indicate whether MG2 shall be cancelled comprises one or more NSC signals, which are also DCI signals, but the difference is that the MG cancellation information considered is prior to MG1, i.e., a MG before the particular MG the UE and the NW determine whether to cancel or not. In this scheme, the UE and the NW checks one or more NSC signals prior to the first of the two MGs to determine if there is any collision between the second of the two MGs and transmissions to/from the wireless device scheduled by any of the one or more NSC signals. The rest of the details of this scheme can be referred to in the description of Option 1 for Situation 1 and is not repeated for brevity.

Figure 11:
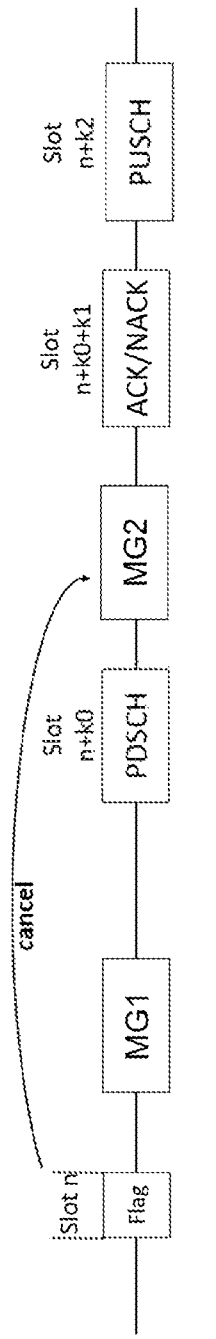
FIG. 11 illustrates MG cancellation based on an explicit indication for a MG of the two non-overlapping MGs according to some embodiments.

FIG. 11 illustrates an explicit indication scheme for cancellation of the second MG of the two overlapping, successive and concurrent MGs according to some embodiments. MG1 and MG2 are the two overlapping, successive and concurrent MGs. In these embodiments, the particular MG that the UE and the NW determine whether to cancel is MG2, i.e. the second one of the two overlapping, successive and concurrent MGs. The MG cancellation information received by the UE from the NW to determine whether MG2 shall be cancelled is prior to MG1, i.e. the first one of the two MGs. As the explicit indication scheme, like Option 2 for Situation 1 as discussed above with reference to FIG. 8, the MG cancellation information to explicitly indicate whether MG2 shall be cancelled comprises an indicator in a downlink (DL) control command, such as a flag for MG2 or a bitmap string with each bit corresponding to a MG of a number of MGs comprising the MG2 after a slot for the downlink control command, but the difference is that the MG cancellation information considered is prior to MG1, i.e., a MG before the particular MG the UE and the NW determine whether to cancel or not. In this scheme, the UE and the NW checks the indicator in the downlink control command prior to the first of the two MGs to determine if the second of the two MGs shall be cancelled. The rest of the details of this scheme can be referred to in the description of Option 2 for Situation 1 and is not repeated for brevity.

In this situation, the measurement delay caused by the cancellation of MGs can also be calculated based on the expressions in Table 2.

Situation 3: Two Partially or Fully Overlapping MGs Considered

Still considering the concurrent MG pattern scenario, since the NW cannot always guarantee the alignment of a configuration for a RS (e.g., SMTC configuration or PRS configuration) among different layers, it is possible to have two successive MGs from concurrent different MG patterns to at least partially overlap with each other in reality.

Figure 12:
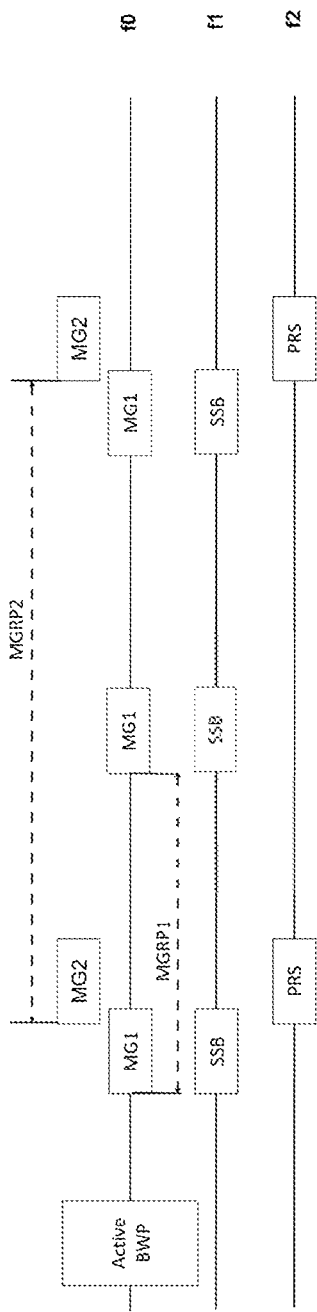
FIG. 12 illustrates two partially overlapping MGs from concurrent MG patterns according to some embodiments.

In some embodiments, the first MG of the two successive MGs from concurrent different MG patterns overlaps at least partially in time domain with the second MG of the two successive MGs. FIG. 12 illustrates two partially overlapping MGs from concurrent MG patterns according to some embodiments. FIG. 12 is similar to FIG. 9 except that MG1 partially overlaps with MG2, i.e., the time interval between MG1 and MG2, $\Delta T$, is less than zero.

For the present situation where two successive MGs from concurrent different MG patterns at least partially overlap with each other, the schemes of implicit indication and explicit indication as discussed above with reference to FIG. 10-11 for Situation 2 can also apply, but with some additional restrictions.

According to some embodiments, as one of the additional restrictions, a first measurement objective to be measured in the first MG does not overlap in time domain with a second measurement objective to be measured in the second MG. Although the first MG and the second MG overlaps, the first measurement objective does not necessarily overlap with the second measurement objective because the duration for measurement the first measurement objective may not occupy the whole length of the first MG, and similarly the duration for measurement the second measurement objective may not occupy the whole length of the second MG. For a MG (either the first MG or the second MG), the start time for measuring a measurement objective associated with the MG may not be aligned with the start time of the MG and the duration for measuring the measurement objective may not be equal to the length of the MG.

According to some embodiments, as another one of the additional restrictions, a time interval between the end of the first measurement objective to be measured in the first MG and the start of the second MG is not less than a minimum radio frequency (RF) switching time. This is to guarantee that there is enough time for RF switching between the end of the RS to be measured in the first MG and the start of the second MG. According to 3GPP specification, the RF switching time may be defined as 0.5 ms in FR1 and 0.25 ms in FR2.

With these two additional restrictions, even if based on the scheme of implicit indication or explicit indication it is determined that the second MG shall not be cancelled because of no collision or no explicit indication to cancel, the measurement operation during the second MG can be successfully carried out.

Figure 13:
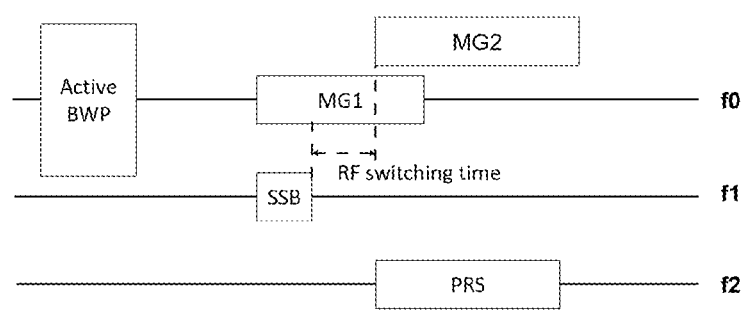
FIG. 13 illustrates two partially overlapping MGs from concurrent MG patterns according to some embodiments.

FIG. 13 illustrates two partially overlapping MGs from concurrent MG patterns that satisfy the two additional restrictions according to some embodiments. As shown in FIG. 13, although MG1 and MG2 overlaps, but the SSB corresponding to MG1 and the PRS corresponding to MG2 does not overlap, Additionally, the time interval between the end of the SSB and the start time of MG2 is not less than the minimum RF switching time. Therefore, the scheme of implicit indication or explicit indication as discussed above with reference to FIG. 10-11 for Situation 2 can be applied to determine if MG2 shall be cancelled.

In this situation, the measurement delay caused by the cancellation of MGs can also be calculated based on the expressions in Table 2.

Option 3: Round-Robin MG Cancellation

Figure 14:
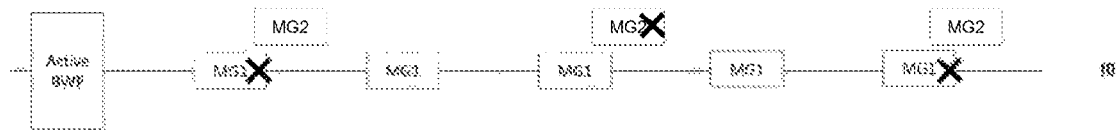
FIG. 14 illustrates MG cancellation in a round-robin fashion according to some embodiments.

Unlike the concepts of implicit or explicit indication to determine whether a particular MG shall be cancelled, in some embodiments, the UE and the NW may be configured to cancel MGs in a round robin fashion. In response to an MG according to a first MG pattern collides with an MG according to a second MG pattern in a first time window and an MG according to a first MG pattern collides with an MG according to a second MG pattern in a second time window, the UE may determine to cancel the MG from the first MG pattern at the first time window and cancel the MG from the second MG patter at the second time window. When there are more than three pairs of colliding MGs from two MG patterns, MGs from the two MG patterns are cancelled alternatively. FIG. 14 illustrates MG cancellation in a round-robin fashion according to some embodiments. As shown in FIG. 14, MGs from the first MG pattern ("MG1") and MGs from the second MG pattern ("MG2") are overlapping and are cancelled in a alternative way.

The UE and the NW may make an agreement on the specific round-robin fashion of MG cancellation and take coordinated actions. For example, if a first MG from the first MG pattern is cancelled at the first time window and a second MG from the second MG pattern colliding with the first MG is maintained at the first time window, the UE may skip the first MG and keep monitoring scheduling signals during the first MG, and further perform measurement during the second MG and stop monitoring scheduling during the second MG. Accordingly, the NW is allowed to schedule the UE during the first MG and shall not schedule the UE during the second MG. During overlapping part of the first MG and the second MG, the UE may be configured to perform the measurement and the NW may be configured not to schedule the UE.

In this option, the measurement delay caused by the cancellation of MGs can also be calculated based on the expressions in Table 2.

It should be appreciated that although different schemes are described for different situations, the schemes can be adopted in a combination in the same situation. For example, for different MGs of one or more MG patterns, cancellation of some MGs may be based on explicit indication method, while cancellation of other MGs may be based on implicit indication method. As another example, in determining if a second MG of two successive MGs from different, concurrent MG patterns shall be cancelled, the explicit or implicit indication method for Situation 1 may be combined with the explicit or implicit indication method for Situation 2. Specifically, the UE may receive the MG cancellation information immediately before the second MG (i.e., there is no other MG between the MG cancellation information and the second MG) and determine whether the second MG shall be cancelled based on the MG cancellation information immediately before the second MG. The UE may further receive the MG cancellation information immediately before a first MG of the two successive MGs (i.e., there is no other MG between the MG cancellation information and the first MG) and determine whether the second MG shall be cancelled based on the MG cancellation information immediately before the first MG. If either the MG cancellation information immediately before the second MG or the MG cancellation information immediately before the first MG indicates that the second MG shall be cancelled, the UE determines that the second MG shall be cancelled.

Exemplary Operations for a UE

Figure 3:
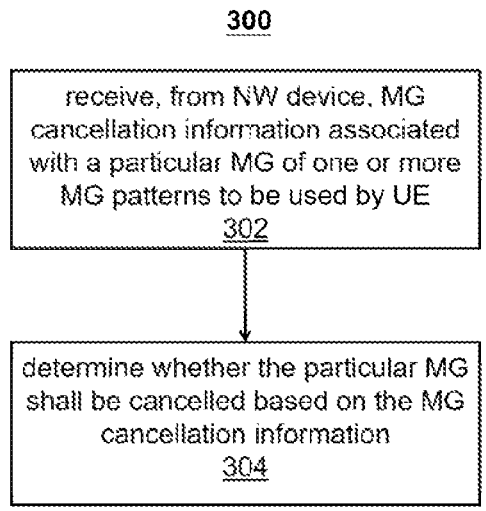
FIG. 3 is a flowchart diagram illustrating an example method for a UE, according to some embodiments.

FIG. 3 is a flowchart diagram illustrating an example method 300 for a UE, according to some embodiments. Aspects of the method 300 may be implemented by a wireless device such as a wireless device 202 illustrated in various of the Figures herein and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

In various embodiments, some of the elements of the methods shown may be performed concurrently, in a different order than shown, may be substituted for by other method elements, or may be omitted. Additional elements may also be performed as desired. As shown, the method 300 may operate as follows.

At block 302, a wireless device (also referred to as "UE" hereinafter for simplicity) may receive, from a network (NW) device, measurement gap (MG) cancellation information associated with a particular MG of one or more MG patterns to be used by the UE. At block 304, the UE may determine whether the particular MG shall be cancelled based on the MG cancellation information.

According to some embodiments, the MG cancellation information comprises one or more network scheduling configuration (NSC) signals prior to the particular MG, and wherein the determining whether the particular MG shall be cancelled comprises: determining whether there is any collision between the particular MG and transmissions to/from the wireless device scheduled by any of the one or more NSC signals.

According to some embodiments, the determining whether the particular MG shall be cancelled further comprises determining that the particular MG shall be cancelled in response to a determination that there is a collision between the particular MG and the transmissions to/from the wireless device scheduled by any of the one or more NSC signals.

According to some embodiments, the one or more NSC signals comprise DCI signals, and wherein the transmissions to/from the wireless device comprises at least one of: Physical Downlink Shared Channel (PDSCH) signals scheduled by the DCI signals: responses carried in Physical Uplink Control Channel (PUCCH) signals for the PDSCH signals; or Physical Uplink Shared Channel (PUSCH) signals scheduled by the DCI signals.

According to some embodiments, the MG cancellation information comprises an indicator in a downlink (DL) control command to explicitly indicate whether the particular MG of the one or more MG patterns shall be cancelled.

According to some embodiments, the indicator is a flag for the particular MG or a bitmap string with each bit corresponding to a MG of a number of MGs comprising the particular MG after a slot for the downlink control command.

According to some embodiments, the one or more MG patterns comprises a first MG from a first MG pattern and a successive, second MG from a second MG pattern concurrent to the first MG pattern, wherein the MG cancellation information is received prior to the first MG, and wherein the particular MG comprises at least the second MG.

According to some embodiments, the first MG does not overlap in time domain with the second MG, and wherein a time interval between the first MG and the second MG is not less than a minimum interval.

According to some embodiments, the first MG at least partially overlaps in time domain with the second MG, a first measurement objective to be measured in the first MG does not overlap in time domain with a second measurement objective to be measured in the second MG, and a time interval between the end of the first measurement objective to be measured in the first MG and the start of the second MG is not less than a minimum radio frequency (RF) switching time.

According to some embodiments, the method further comprises: performing measurement in the particular MG in response to determining that the particular MG shall not be cancelled; and performing no measurement in the particular MG in response to determining that the particular MG shall be cancelled.

Exemplary Operations for a NW Device

Figure 4:
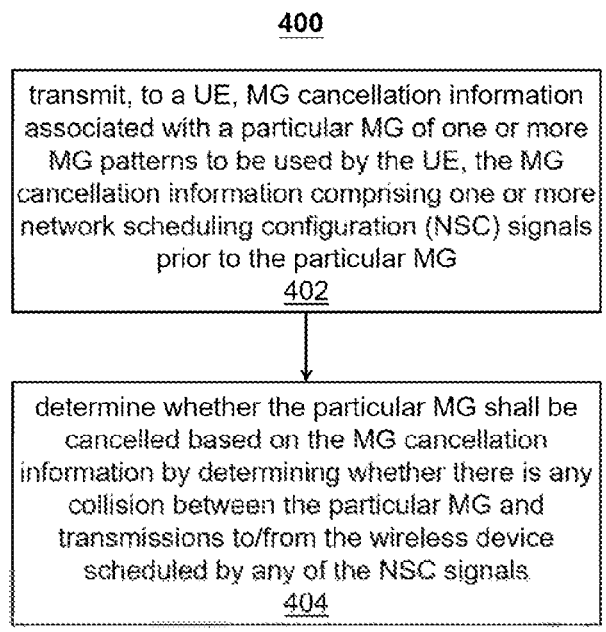
FIG. 4 is a flowchart diagram illustrating an example method for a NW device, according to some embodiments.

FIG. 4 is a flowchart diagram illustrating an example method 400 for a NW device (also referred to as "NW" herein for simplicity), according to some embodiments. Aspects of the method 400 may be implemented by a base station such as a network device 218 illustrated in various of the Figures herein and/or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. As shown, the method 400 may operate as follows.

At block 402, a wireless device (also referred to as "NW" hereinafter for simplicity) may transmit, to a user equipment (UE), measurement gap (MG) cancellation information associated with a particular MG of one or more MG patterns to be used by the UE. The MG cancellation information may comprise one or more network scheduling configuration (NSC) signals prior to the particular MG. At block 404, the NW may determine whether the particular MG shall be cancelled based on the MG cancellation information by determining whether there is any collision between the particular MG and transmissions to/from the wireless device scheduled by any of the one or more NSC signals.

According to some embodiments, to determine whether the particular MG shall be cancelled, the NW may further determine that the particular MG shall be cancelled in response to a determination that there is a collision between the particular MG and the transmissions to/from the wireless device scheduled by any of the one or more NSC signals.

According to some embodiments, the one or more NSC signals may comprise DCI signals.

According to some embodiments, the transmissions to/from the wireless device may comprise at least one of: Physical Downlink Shared Channel (PDSCH) signals scheduled by the DCI signals; responses carried in Physical Uplink Control Channel (PUCCH) signals for the PDSCH signals; or Physical Uplink Shared Channel (PUSCH) signals scheduled by the DCI signals.

According to some embodiments, the one or more MG patterns comprises a first MG from a first MG pattern and a successive, second MG from a second MG pattern. The MG cancellation information may be transmitted prior to the first MG. The particular MG may comprise at least the second MG.

According to some embodiments, the first MG may not overlap in time domain with the second MG, and a time interval between the first MG and the second MG may be not less than a minimum interval.

According to some embodiments, the first MG may at least partially overlap in time domain with the second MG, and a first measurement objective to be measured in the first MG may not overlap in time domain with a second measurement objective to be measured in the second MG, and a time interval between the end of the first measurement objective to be measured in the first MG and the start of the second MG may be not less than a minimum radio frequency (RF) switching time.

According to some embodiments, the NW may schedule no transmissions to/from the UE in the particular MG in response to determining that the particular MG shall not be cancelled or may schedule transmissions to/from the UE in the particular MG in response to determining that the particular MG shall be cancelled.

FIG. 5 is a flowchart diagram illustrating an example method 500 for a NW device (also referred to as "NW" herein for simplicity), according to some embodiments. Similar to method 400, aspects of the method 500 may be implemented by a base station such as a network device 218. As shown, the method 500 may operate as follows.

At block 502, the NW may determine whether a particular measurement gap (MG) of one or more MG patterns to be used by a user equipment (UE) shall be cancelled. At block 504, the NW may transmit, to the UE, MG cancellation information associated with the particular MG. The MG cancellation information may comprise an indicator in a downlink control command to explicitly indicate whether the particular MG of the one or more MG patterns shall be cancelled.

According to some embodiments, the downlink control command may be in a form of a physical-layer control command or a Medium Access Control (MAC)-layer control command.

According to some embodiments, the indicator may be a flag for the particular MG or a bitmap string for a number of MGs comprising the particular MG after a slot for the downlink control command.

In various embodiments, some of the elements of the methods (including method 300, 400, and 500) shown may be performed concurrently, in a different order than shown, may be substituted for by other method elements, or may be omitted. Additional elements may also be performed as desired.

Embodiments contemplated herein include an apparatus comprising means to perform one or more elements of the method 300. This apparatus may be, for example, an apparatus of a UE (such as a wireless device 202 that is a UE, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a UE (such as a memory 206 of a wireless device 202 that is a UE, as described herein).

Embodiments contemplated herein include an apparatus comprising logic, modules, or circuitry to perform one or more elements of the method 300. This apparatus may be, for example, an apparatus of a UE (such as a wireless device 202 that is a UE, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a UE (such as a wireless device 202 that is a UE, as described herein).

Embodiments contemplated herein include a signal as described in or related to one or more elements of the method 300.

Embodiments contemplated herein include a computer program or computer program product comprising instructions, wherein execution of the program by a processor is to cause the processor to carry out one or more elements of the method 300. The processor may be a processor of a UE (such as a processor(s) 204 of a wireless device 202 that is a UE, as described herein). These instructions may be, for example, located in the processor and/or on a memory of the UE (such as a memory 206 of a wireless device 202 that is a UE, as described herein).

Embodiments contemplated herein include an apparatus comprising means to perform one or more elements of the method 400/500. This apparatus may be, for example, an apparatus of a base station (such as a network device 218 that is a base station, as described herein).

Embodiments contemplated herein include one or more non-transitory computer-readable media comprising instructions to cause an electronic device, upon execution of the instructions by one or more processors of the electronic device, to perform one or more elements of the method 400/500. This non-transitory computer-readable media may be, for example, a memory of a base station (such as a memory 222 of a network device 218 that is a base station, as described herein).

Embodiments contemplated herein include an apparatus comprising logic, modules, or circuitry to perform one or more elements of the method 400/500. This apparatus may be, for example, an apparatus of a base station (such as a network device 218 that is a base station, as described herein).

Embodiments contemplated herein include an apparatus comprising: one or more processors and one or more computer-readable media comprising instructions that, when executed by the one or more processors, cause the one or more processors to perform one or more elements of the method 400/500. This apparatus may be, for example, an apparatus of a base station (such as a network device 218 that is a base station, as described herein).

Embodiments contemplated herein include a signal as described in or related to one or more elements of the method 400/500.

Embodiments contemplated herein include a computer program or computer program product comprising instructions, wherein execution of the program by a processing element is to cause the processing element to carry out one or more elements of the method 400/500. The processor may be a processor of a base station (such as a processor(s) 220 of a network device 218 that is a base station, as described herein). These instructions may be, for example, located in the processor and/or on a memory of the UE (such as a memory 222 of a network device 218 that is a base station, as described herein).

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a user equipment (UE), the method comprising:
receiving, from a network (NW) device, measurement gap (MG) cancellation information associated with a particular MG of one or more MG patterns to be used by the UE;
wherein the one or more MG patterns comprises a first MG from a first MG pattern and a successive, second MG from a second MG pattern, wherein the MG cancellation information is received prior to the first MG, and wherein the particular MG comprises at least the second MG;
wherein the first MG at least partially overlaps in time domain with the second MG, wherein a first measurement objective to be measured in the first MG does not overlap in the time domain with a second measurement objective to be measured in the second MG, and wherein a time interval between the end of the first measurement objective to be measured in the first MG and the start of the second MG is not less than a minimum radio frequency (RF) switching time; and
determining whether the particular MG shall be cancelled based on the MG cancellation information.

2. The method according to claim 1, wherein the MG cancellation information comprises one or more network scheduling configuration (NSC) signals prior to the particular MG, and wherein the determining whether the particular MG shall be cancelled comprises:
determining whether there is any collision between the particular MG and transmissions to/from the UE scheduled by any of the one or more NSC signals.

3. The method according to claim 2, wherein the determining whether the particular MG shall be cancelled further comprises:
determining that the particular MG shall be cancelled in response to a determination that there is a collision between the particular MG and the transmissions to/from the UE scheduled by any of the one or more NSC signals.

4. The method according to claim 2, wherein the one or more NSC signals comprise DCI signals, and wherein the transmissions to/from the UE comprises at least one of:
Physical Downlink Shared Channel (PDSCH) signals scheduled by the DCI signals;
responses carried in Physical Uplink Control Channel (PUCCH) signals for the PDSCH signals; or
Physical Uplink Shared Channel (PUSCH) signals scheduled by the DCI signals.

5. The method according to claim 1, wherein the MG cancellation information comprises an indicator in a downlink (DL) control command to explicitly indicate whether the particular MG of the one or more MG patterns shall be cancelled.

6. The method according to claim 5, wherein the indicator is a flag for the particular MG or a bitmap string with each bit corresponding to a MG of a number of MGs comprising the particular MG after a slot for the downlink control command.

7. The method according to claim 1, wherein the method further comprises:
performing measurement in the particular MG in response to determining that the particular MG shall not be cancelled; and
performing no measurement in the particular MG in response to determining that the particular MG shall be cancelled.

8. A method for a network (NW) device, the method comprising:
transmitting, to a user equipment (UE), measurement gap (MG) cancellation information associated with a particular MG of one or more MG patterns to be used by the UE, the MG cancellation information comprising one or more network scheduling configuration (NSC) signals prior to the particular MG;
wherein the one or more MG patterns comprises a first MG from a first MG pattern and a successive, second MG from a second MG pattern, wherein the MG cancellation information is transmitted prior to the first MG, and wherein the particular MG comprises at least the second MG;
wherein the first MG at least partially overlaps in time domain with the second MG, wherein a first measurement objective to be measured in the first MG does not overlap in the time domain with a second measurement objective to be measured in the second MG, and wherein a time interval between the end of the first measurement objective to be measured in the first MG and the start of the second MG is not less than a minimum radio frequency (RF) switching time; and
determining whether the particular MG shall be cancelled based on the MG cancellation information by determining whether there is any collision between the particular MG and transmissions to/from the UE scheduled by any of the one or more NSC signals.

9. The method according to claim 8, the determining whether the particular MG shall be cancelled further comprises:
determining that the particular MG shall be cancelled in response to a determination that there is a collision between the particular MG and the transmissions to/from the UE scheduled by any of the one or more NSC signals.

10. The method according to claim 8, wherein the one or more NSC signals comprise DCI signals, and wherein the transmissions to/from the UE comprises at least one of:
Physical Downlink Shared Channel (PDSCH) signals scheduled by the DCI signals;
responses carried in Physical Uplink Control Channel (PUCCH) signals for the PDSCH signals; or
Physical Uplink Shared Channel (PUSCH) signals scheduled by the DCI signals.

11. The method according to claim 8, wherein the method further comprises:
scheduling no transmissions to/from the UE in the particular MG in response to determining that the particular MG shall not be cancelled; and
scheduling transmissions to/from the UE in the particular MG in response to determining that the particular MG shall be cancelled.

* * * * *